June 11, 1968      D. BERLIN      3,387,883
CHILD'S SAFETY AUTOMOBILE SEAT
Original Filed Sept. 24, 1963      2 Sheets-Sheet 1
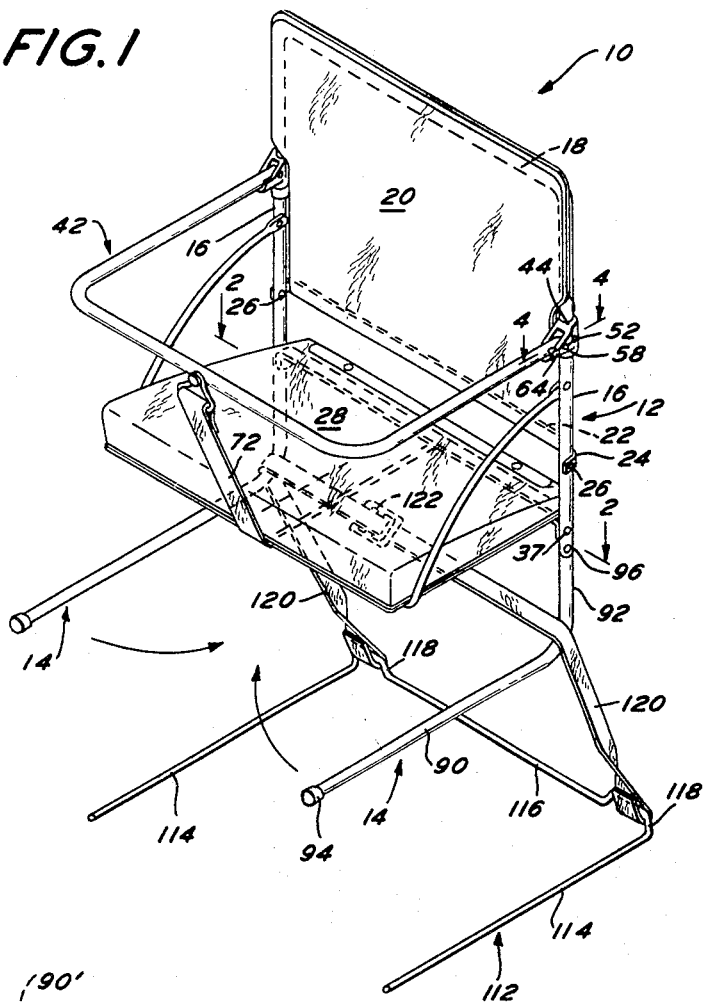
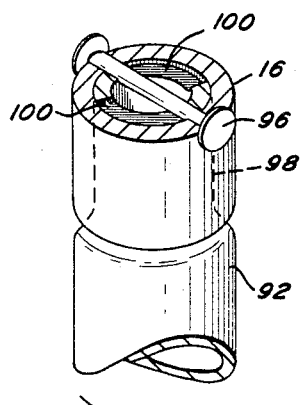
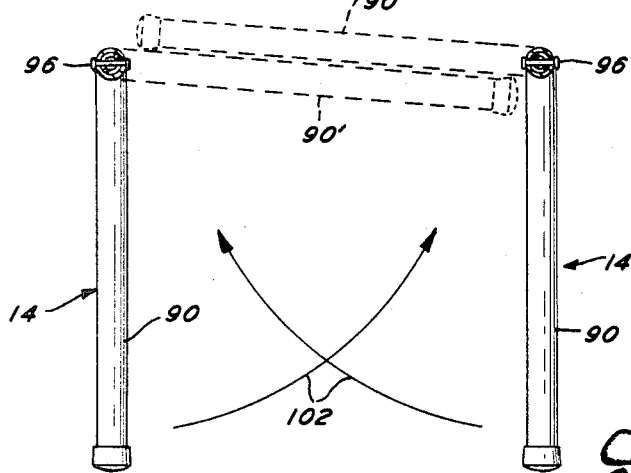
INVENTOR.
DANIEL BERLIN
BY Cassar, Rivise, Bernstein & Cohen
ATTORNEYS.

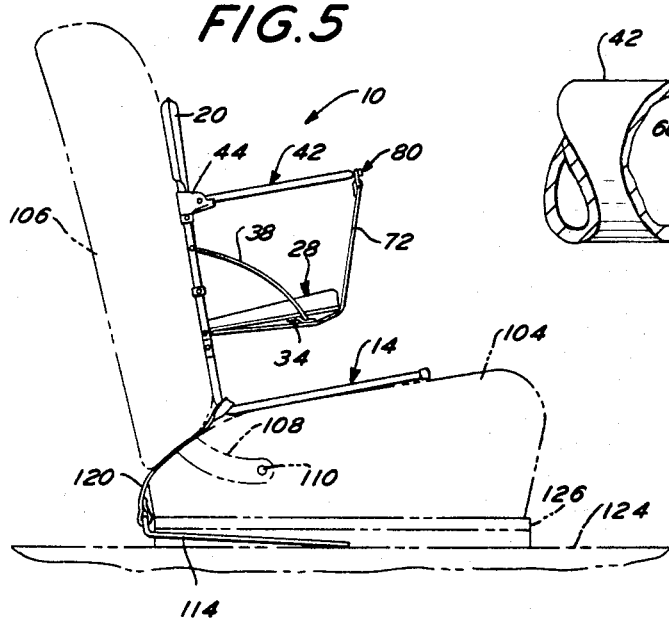
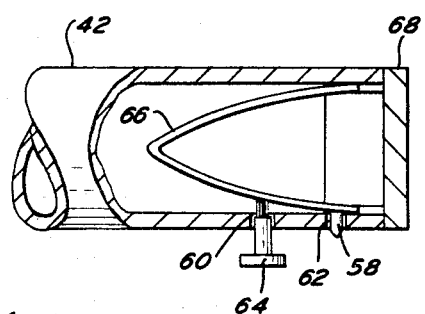
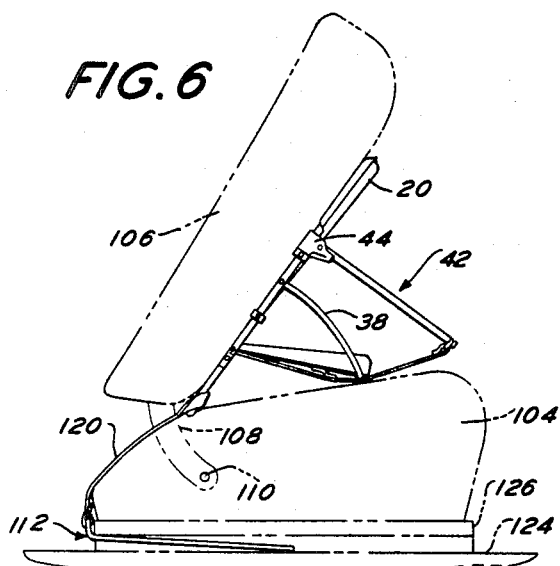
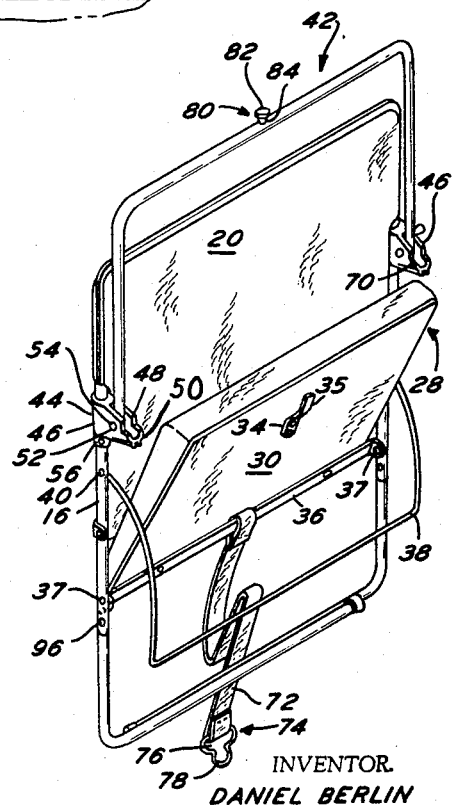

United States Patent Office 3,387,883
Patented June 11, 1968

3,387,883
CHILD'S SAFETY AUTOMOBILE SEAT
Daniel Berlin, 4424 Paul St.,
Philadelphia, Pa. 19124
Continuation of application Ser. No. 311,114, Sept. 24, 1963. This application Jan. 6, 1966, Ser. No. 519,053
2 Claims. (Cl. 297—253)

ABSTRACT OF THE DISCLOSURE

A child's car seat comprising a tubular frame, a back portion and a seat portion pivotally mounted on the frame. The frame also includes legs which are pivotable around vertical axes for supporting the car seat on the seat of an automobile. Means are associated with the frame for securing the car seat in place on the automobile seat.

---

This application is a continuation of my co-pending application Ser. No. 311,114, filed Sept. 24, 1963, now abandoned.

This invention relates to a car seat which is mounted on the front seat of an automobile for supporting a child therein.

In a more particular aspect of this invention it relates to a child's automobile seat that can be used with far more safety to the child than was previously obtainable with the car seats of the prior art.

Car seats for supporting children are well known in the art. These seats basically comprise a seat portion, a back portion, a frame for holding said seat portion and said back portion in a horizontal and vertical disposition, respectively, hook means for securing the frame to the back of an automobile seat and a guard rail for holding the child on the car seat.

In the past, many improvements have been made in the basic car seat structure. Included among them were means for making the entire assembly collapsible. Other means were provided for making the guard rail pivotable on one side thereof so that the guard rail could be opened to permit a child to be easily inserted on the car seat. Thereafter, the guard rail was closed and secured in place to prevent the child from falling off the seat.

Prior to this invention, however, all of the car seats were suspended from the back of the front seat of a car. In four door cars wherein the back of the front seat was unitary, this presented no problem. However, in two door cars wherein the back of the front seat is in two sections, with each of the sections being tiltable forward, a very serious problem is presented. Thus, in normal practice, the car seat would be supported by one of the back sections while the driver would be leaning against the other back section. If an emergency necessitated an immediate stop, quite often the back section supporting the child would fly forward due to the momentum of the child and the section. Many times this resulted in injury to the child.

The car seat of this invention overcomes the aforementioned problems of the prior art car seats. The car seat of this invention is supported by the front seat of the car rather than the back of the front seat. Anchoring means are provided to prevent the car seat from sliding off the front seat of the car in case of a sudden stop. Additionally, means are provided for the folding forward of the car seat whenever it is desired to tilt the back of the front seat of the car to permit access into the rear of the car.

It is, therefore, an object of this invention to provide a novel car seat.

It is another object of this invention to provide a car seat which can be supported in a car with greater safety than those of the prior art.

It is a further object of this invention to provide a car seat which can be mounted on the rear seat of a car.

It is a further object of this invention to provide a car seat which can be mounted on the front seat of a car and can be tilted forward to permit access into the rear of the car.

It is a further object of this invention to provide a car seat which is collapsible for easy storage.

These and other objects of this invention are accomplished by providing a car seat comprising a frame, said frame being adapted to be supported by the seat of an automobile, said frame including a back portion and a seat portion, a guard rail mounted on said frame, and anchoring means for maintaining said frame on said automobile seat.

Other objects and many of the attendant advantages of this invention will be readily appreciated as the same becomes better understood by reference to the following detailed description when considered in connection with the accompanying drawings wherein:

FIG. 1 is a perspective view of the car seat of this invention;

FIG. 2 is an enlarged sectional view taken along the line 2—2 of FIG. 1, with the anchoring strap removed for the purpose of clarity, and showing the collapsed condition of the supporting legs in phantom;

FIG. 3 is an enlarged perspective view, partially in section, showing the securement of the supporting legs in the frame of the car seat;

FIG. 4 is an enlarged sectional view taken along the line 4—4 of FIG. 1, with the supporting bracket and frame removed for the purpose of clarity;

FIG. 5 is a side elevational view showing the car seat of this invention mounted on an automobile seat;

FIG. 6 is a side elevational view of the car seat of this invention similar to FIG. 5, but showing the condition of the seat when the back portion of the automobile seat is tilted forward; and, FIG. 7 is a perspective view of the car seat of this invention in its collapsed condition.

Referring now in greater detail to the various figures of the drawings wherein similar reference characters refer to similar parts, a child's safety automobile seat embodying the present invention is generally shown at 10 in FIG. 1.

Device 10 basically includes a U-shaped tubular frame member 12 having a pair of substantially horizontal legs 14 rotatably mounted in the bottom thereof. Frame member 12 includes a pair of vertical legs 16 with an integral bridging section 18 being uppermost. A back 20 comprising a covering of plastic coated fabric over a resilient material such as foam rubber is secured on frame 12. This securement is accomplished by providing a pocket in the fabric portion of the back which is telescoped over bridging section 18 and legs 16. The bottom of the back is secured to a horizontal bar 22 having ends 24 which are riveted to legs 16 at 26.

A seat 28 is pivotally mounted to and between legs 16. As seen in FIG. 7 seat 28 includes a rigid base 30, which may be metallic or fiberboard and an upholstered padded top 32. Again, the padding can be foam rubber and the upholstery can be a plastic coated fabric which is waterproof. Fabrics of this type and for this purpose are well known in the art. Mounted on the undersurface of the seat is a clamp 34. The lower portion 35 of the clamp lies parallel to base 30 of the seat and is vertically spaced therefrom. It is thus seen that clamp 34 is provided with an opening facing outwardly of the base of the seat. The seat is riveted to bar 36 (FIG. 7) which is in turn pivotally secured to legs 16 by rivets 37.

A substantially U-shaped rod 38 is pivotally secured to legs 16 by rivets 40. In use, as seen in FIG. 5, the seat 28 is maintained in a horizontal position by engaging rod 38 in clamp 34. When it is desired to collapse the car seat, rod 38 is disengaged from clamp 34, seat 28 is pivoted upwardly and rod 38 is pivoted downwardly (see FIG. 7). This particular aspect of the invention is well known in the art.

A tubular U-shaped guard rail 42 is rotatably mounted on frame 12. This mounting is accomplished by means of a pair of identical brackets 44 mounted on the frame. These brackets are disclosed in greater detail in my application Ser. No. 182,769, now Patent No. 3,146,026. Basically, each of the brackets includes a tubular sleeve 46 which is telescoped over leg 16. A pair of spaced vertical walls 48 project outwardly from the sleeve. The walls are spaced a sufficient distance to permit the entry of guard rail 42. The walls 48 are joined at their bottoms by an arcuate wall 50. Each pair of walls 48 is provided with a pair of aligned holes 52. Guard rail 42 is secured in one of brackets 44 by a rivet 54 passing through holes 52 and the guard rail.

The bracket 44 having the riveted end of guard rail 42 is rotably mounted on associated leg 16. A collar 56 (FIG. 7) is riveted to the same leg 16 immediately below bracket 44. The purpose of the collar is to insure that the vertical position of bracket 44 will be maintained. Thus, the collar prevents the sliding down of the bracket. The other bracket 44 is riveted to its associated leg 16.

In use, guard rail 42 is rotated clockwise in a horizontal plane around the left bracket 44 from the position shown in FIGS. 1 and 5. The child is then placed in the car seat and the guard rail is returned to its original position. As more fully disclosed in my application Ser. No. 182,779 now Patent No. 3,146,026, the guard rail is maintained in place by a resiliently mounted locking pin 58 in hole 52 of the right-hand bracket 44. The locking pin and its securement in guard rail 42 are shown in greater detail in FIG. 4. Thus, it is seen that guard rail 42 is provided with a pair of aligned holes 60 and 62 on one side thereof. Locking pin 58 projects out of hole 62 and a depressable button 64 projects out of hole 60. The locking pin 58 and button 64 are normally resiliently forced out of said holes by means of V-shaped leaf spring 66 mounted within the guard rail. A suitable end cap 68 closes the end of guard rail 42.

The securement of the guard rail in right-hand bracket 44 is shown in FIG. 1. As previously pointed out, pin 58 projects out of hole 62. When it is desired to pivot the guard rail, button 64 is depressed, thereby depressing pin 58, and thus permitting the removal of the guard rail. Another feature of the brackets of this invention is the shortening of walls 46 at the front thereof, as shown at 70 in FIG. 7. Thus, it is seen that button 64 rests on the foreshortened part of walls 46. In this manner guard rail 42 is easily pivoted upwardly to the position shown in FIG. 7 by pivoting around rivet 54 and locking pin 58. This pivoting feature is an additional way for placing a baby within the seat and also permits the collapsing of the car seat for storage.

As an additional safety feature, a crotch strap 72 is provided. As seen in FIG. 7, crotch strap 72 is secured to the car seat by looping one end thereof around bar 36 and securing the end in place. The other end of the crotch strap is provided with a clamp 74 having a large hole 76 and a small hole 78 in communication with the large hole. Guard rail 42 is provided with a knob 80 on the outer portion of the center thereof. As seen in FIG. 7, knob 80 includes a large head 82 on a pin 84 which is of a smaller diameter than the head.

As seen in FIGS. 1 and 5, the crotch strap is used by bringing the end having clamp 74 thereon up from under the seat and looping the clamp over knob 80. The diameter of hole 76 is sufficiently large to pass over the head 82 and the diameter of hole 78 is larger than the diameter of pin 84 but smaller than the diameter of head 82.

As previously pointed out the frame 12 includes a pair of horizontal legs 14. Each leg 14 includes a horizontal portion 90 and an integral vertical portion 92. The ends of legs 90 are closed by conventional end caps 94. The vertical portions 92 of the legs 14 are pivotally secured in legs 16 by rivets 96. This securement is shown in greater detail in FIG. 3. Thus, it is seen that portions 92 include narrow ends 98 which are telescoped within legs 16. Portions 92 terminate just short of rivets 37 (FIG. 1). Immediately below the tops of the narrow portions 92, a pair of opposed slots 100 are cut for the reception of rivets 96. As seen in FIG. 3, each slot extends for slightly more than 90° of the circumference of portion 92. The purpose of the slots is to limit the arc of pivoting of legs 14. Additionally, since the top of portion 92 is unitary above the slots, the legs 14 are held securely in place. As seen in FIG. 2, horizontal portions 90 are pivotable in the direction of arrows 102 to the positions shown at 90'. The limit of outward pivoting is that shown at 90 in FIG. 2. Thus, as is apparent from FIG. 2, legs 14 are pivoted in a horizontal plane around vertical axes through said frame.

In use, legs 14 will support the car seat of this invention in an upright position without the necessity of any supporting means such as the suspending hooks of the prior art. Thus, as seen in FIG. 5, car seat 10 is supported on automobile seat 104 and rests against the back 106 of the automobile seat. In the embodiment shown, the automobile is a two door car and the back of the seat 106 will pivot forward on brackets 108 around rivets 110.

Since no suspending hooks are used, the seat is anchored in place by means secured to the frame of the car seat. In the embodiment shown, the anchoring means comprises a U-shaped bar 112 having legs 114 and bridging section 116. Bridging section 116 is provided with a pair of off-set sections 118 at the outer extremities thereof. A two piece strap 120 has one section secured to each of the off-set portions. The strap is provided with an infinitely adjustable buckle 122. Any buckle of this type which is well known in the art can be used. For example, a conventional automobile seat belt buckle can be used.

In use, legs 114 of bar 112 are slid under the seat of the car and positioned between the floor board 124 and the bottom of the seat. In substantially all cars, the seat is slidable in a track 126 and is raised from the floor. The strap 120 is then placed between the seat 104 and the back 106 and brought forwardly. Thereafter, the buckle is closed and tightened thereby holding legs 14 securely in place. This position is shown in FIGS. 1 and 5.

With the car seat so held, there is no danger of back 106 flying forward thereby propelling the baby, since the bearing of the seat against the back by means of the strap and supporting legs 14 will prevent the forward movement of back 106. Additionally, since the seat is supported by the resilient automobile seat 104, a more comfortable ride is provided for the child than would be obtainable by the suspension of the car seat from the rear portion of the front seat.

When it is desired to permit entry of passengers into the rear of the car, legs 14 are pivoted inwardly to the position shown at 90' in FIG. 2. Thereafter, it is a relatively simple matter to pivot back portion 106 of the automobile seat forward. It should be noted however, that during this pivoting the car seat will still be secured by strap 120 and anchoring bar 112. After the back portion 106 has been returned to its upright position, legs 14 can again be pivoted outwardly to again support the car seat on the front seat of the automobile.

It is thus seen that the car seat of this invention is far safer to the child sitting therein than those of the prior art which were suspended from the back of the front seat of the automobile. It should be noted from FIG. 5 that when the anchoring strap 120 is tightly secured in place, the rear 106 of the automobile seat cannot fly forward when a car stops suddenly in an emergency, since the frame 12 is always held in a bearing relation against car seat 104 and the rear 106.

The anchoring bar 112 and strap 120 are a preferred anchoring means because they can be moved from car to car. Thus, in use, the bar 112 is inserted under the seat of the automobile. The strap 120 is slid between the seat and rear of the seat of the automobile and finally latched in place as shown in FIG. 1. However it is to be understood, that any other suitable anchoring means can be used. Thus, the anchoring means can be permanently mounted in the floor board 124 of the car. For instance, a conventional auto seat belt can be effectively used as the anchoring means.

Any adjustable buckle or securing means can be used as the buckle 122. Thus a buckle having a sliding toothed portion, such as that used in suitcases, may be used. Alternatively a turnbuckle can be secured to the straps or a crank and ratchet arrangement can be used to provide the adjustment.

Another feature of this invention is that the prior art car seats must, of necessity, be used on the front seat of the car in order to allow the supporting hooks to be used. The car seat of this invention can also effectively be used on the rear seat of the car. Thus, the anchoring means can either be mounted to the floor board or can be passed under the rear seat, as shown in FIG. 5 with respect to the front seat. Conventional auto seat belts can effectively be used to mount the car seat on the rear seat of an automobile.

Another feature of the car seat of this invention is that it can be disassociated from the anchoring means and used as a portable child's chair. Thus, the car seat can be placed on a conventional chair and be used to elevate the child at a dining table. If desired, the seat can be secured to the dining chair by means of a conventional belt. Also, a removable tray top can be provided which would be mounted on guard rail 42 to enable the seat to be used as a portable highchair when secured on top of a conventional dining chair.

Obviously, many modifications and variations of the present invention are possible in the light of the above teachings. It is, therefore to be understood that within the scope of the appended claims, the invention may be practiced otherwise than as specifically described.

What is claimed as the invention is:

1. A child's car seat comprising a tubular frame, a back portion mounted on said frame, a seat portion pivotally mounted on said frame, said frame lying in a substantially vertical plane and adapted to rest against the backrest of an automobile seat, a pair of substantially horizontal legs mounted on said frame which are adapted to rest on the seat of an automobile, said legs being pivotally mounted in the bottom of said frame and projecting perpendicularly outward therefrom, said legs being pivotable around vertical axes through said frame, anchoring means for maintaining said legs on said automobile seat and said frame against said backrest, and a guard rail pivotally mounted on said frame whereby said child's car seat may be collapsed for storage by pivoting said seat portion, legs and guard rail into a plane which is substantially parallel to the plane of said frame.

2. The car seat of claim 1 wherein the pivoting of said legs is limited from a position substantially perpendicular to the plane of said frame to a position substantially parallel to the plane of said frame.

References Cited

UNITED STATES PATENTS

| | | | |
|---|---|---|---|
| 1,232,985 | 7/1917 | Settan | 297—250 |
| 2,291,640 | 8/1942 | Lee | 297—255 |
| 2,550,993 | 5/1951 | Goldfine | 297—60 |
| 2,860,692 | 11/1958 | Hamilton | 297—42 |
| 2,888,061 | 5/1959 | Berlin | 297—390 |
| 2,947,353 | 8/1960 | Von Wimmersperg | 297—254 |
| 2,954,070 | 9/1960 | Moeller | 297—250 |
| 2,990,009 | 6/1961 | Moeller | 297—385 |
| 3,000,645 | 9/1961 | Schmidt | 297—250 |
| 3,170,727 | 2/1965 | Peterson | 297—256 |
| 2,723,709 | 11/1955 | Welsh | 297—390 |

FRANCIS K. ZUGEL, *Primary Examiner.*